(12) United States Patent
Fiddle et al.

(10) Patent No.: US 7,979,338 B1
(45) Date of Patent: Jul. 12, 2011

(54) FINANCIAL INSTRUMENT PROVIDING RETURNS AS CASH AND ACCRETION

(75) Inventors: Frederick J. Fiddle, Ridgewood, NJ (US); Stuart C. Kaperst, New York, NY (US); Prasanth Rao-Kathi, Atlantic Highlands, NJ (US); Paul A. Pepe, New York, NY (US); Russell L. Stein, Englewood Cliffs, NJ (US); Yonathan Epelbaum, Brooklyn, NY (US); Richard P. Luciano, Morristown, NJ (US)

(73) Assignee: Bank of America Corporation, Charlotte, NC (US)

( * ) Notice: Subject to any disclaimer, the term of this patent is extended or adjusted under 35 U.S.C. 154(b) by 501 days.

(21) Appl. No.: 10/434,040

(22) Filed: May 8, 2003

Related U.S. Application Data

(63) Continuation-in-part of application No. 10/384,404, filed on Mar. 6, 2003, now abandoned, and a continuation-in-part of application No. 10/218,124, filed on Aug. 12, 2002, and a continuation-in-part of application No. 10/217,885, filed on Aug. 12, 2002, and a continuation-in-part of application No. 10/217,875, filed on Aug. 12, 2002, and a continuation-in-part of application No. 10/064,745, filed on Aug. 12, 2002, and a continuation-in-part of application No. 10/064,744, filed on Aug. 12, 2002.

(60) Provisional application No. 60/311,574, filed on Aug. 10, 2001, provisional application No. 60/311,516, filed on Aug. 10, 2001.

(51) Int. Cl.
*G06Q 40/00* (2006.01)

(52) U.S. Cl. .......................................... 705/37; 705/35
(58) Field of Classification Search .................... 705/35, 705/37
See application file for complete search history.

(56) References Cited

U.S. PATENT DOCUMENTS

| | | | | |
|---|---|---|---|---|
| 5,987,435 | A  * | 11/1999 | Weiss et al. | 705/36 R |
| 6,148,293 | A  * | 11/2000 | King | 705/35 |
| 6,513,020 | B1 * | 1/2003 | Weiss et al. | 705/36 R |
| 7,257,556 | B1 * | 8/2007 | Rifkin | 705/36 R |
| 2002/0052819 | A1* | 5/2002 | Burton | 705/36 |
| 2002/0184142 | A1* | 12/2002 | Whang | 705/38 |
| 2002/0194099 | A1* | 12/2002 | Weiss | 705/36 |
| 2003/0009406 | A1 | 1/2003 | Ross | |

(Continued)

OTHER PUBLICATIONS

Ricoh Company, Ltd., 1998, Non-Consolidated, Year ended Mar. 31, 1998, p. 4.*

(Continued)

*Primary Examiner* — Jagdish N. Patel
*Assistant Examiner* — Kenneth Bartley
(74) *Attorney, Agent, or Firm* — Michael Springs

(57) ABSTRACT

In a method for obtaining capital, a convertible or exchangeable financial instrument having an accreted value and that earns returns over a lifetime comprising at least a first and a second time period is offered. During a first time period, at least some of the returns earned are paid in cash. During a second time period all of the returns earned are accreted to the accreted value of the financial instrument. Returns may be earned during each period according to a rate associated with each period. The rate associated with each period may be fixed or variable and may be modified by one or more rate modifiers, such as a minimum or maximum rate. The financial instrument may include a provision describing how the instrument is serviced when the current value of a rate is negative.

30 Claims, 7 Drawing Sheets

U.S. PATENT DOCUMENTS

| | | | | |
|---|---|---|---|---|
| 2003/0130941 | A1* | 7/2003 | Birle et al. | 705/40 |
| 2003/0163400 | A1* | 8/2003 | Ross et al. | 705/35 |
| 2004/0006520 | A1* | 1/2004 | Birle et al. | 705/35 |
| 2004/0024676 | A1* | 2/2004 | Jones et al. | 705/36 |
| 2004/0193536 | A1* | 9/2004 | Marlowe-Noren | 705/39 |
| 2004/0236667 | A1* | 11/2004 | Cotton | 705/37 |
| 2005/0080706 | A1* | 4/2005 | Birle et al. | 705/37 |

OTHER PUBLICATIONS

Duane Reade Inc., "Prospectus, $381,488,000 Senior Convertible Notes due 2022," Jul. 31, 2002, pp. 1-67, filed with and publicly available from the United States Securities and Exchange Commission.

Lowe's Cos. Inc., "Prospectus Supplement, $505,000,000 Senior Convertible Notes due 2021," Oct. 18, 2001, pp. 1-77, filed with and publicly available from the United States Securities and Exchange Commission.

Merrill Lynch & Co. Inc., "Prospectus Supplement, $2,000,000,000 Liquid Yield Option/TM/ Notes due 2032," Mar. 12, 2002, pp. 1-41, filed with and publicly available from the United States Securities and Exchange Commission.

Selective Insurance Group Inc., "Prospectus, $305,000,000 Senior Convertible Notes due 2032," Feb. 10, 2003, pp. 1-73, filed with and publicly available from the United States Securities and Exchange Commission.

Ply Gem Industries, Inc., "Prospectus, $50,000,000 Convertible Senior Subordinated Discount Debentures due 2008," Oct. 7, 1988, pp. 1-24, Financial Statements, pp. F-1-F-14, filed with and publicly available from the United States Securities and Exchange Commission.

BJ Services Co., "Prospectus, $516,350,000 Convertible Senior Notes Common Stock," Nov. 1, 2002, pp. 1-51, filed with and publicly available from the United States Securities and Exchange Commission.

Indymac Bancorp Inc., "Prospectus Supplement, $175,000,000 Warrants and Income Redeemable Equity Securities (WIRES) Units," Nov. 15, 2001, pp. 1-155, filed with and publicly available from the United States Securities and Exchange Commission.

* cited by examiner

US 7,979,338 B1

FINANCIAL INSTRUMENT PROVIDING RETURNS AS CASH AND ACCRETION

This application is (i) a continuation-in-part of application Ser. No. 10/384,404, filed Mar. 6, 2003 now abandoned entitled "FINANCIAL INSTRUMENT WITH VARIABLE RETURN ACCRETION," the entirety of which is hereby incorporated by reference into this application; (ii) a continuation-in-part of application Ser. No. 10/064,744, filed Aug. 12, 2002, entitled "CONTINGENT CONVERTIBLE FINANCIAL INSTRUMENTS," the entirety of which is hereby incorporated by reference into this application and which claims priority from U.S. Provisional Application No. 60/311,516, filed Aug. 10, 2001; (iii) a continuation-in-part of application Ser. No. 10/217,875, filed Aug. 12, 2002 entitled "METHODS AND SYSTEMS FOR OFFERING AND SERVICING FINANCIAL INSTRUMENTS," the entirety of which is hereby incorporated by reference into this application and which claims priority from U.S. Provisional Application No. 60/311,516, filed Aug. 10, 2001; (iv) a continuation-in-part of application Ser. No. 10/064,745, filed Aug. 12, 2002, entitled "CONVERTIBLE FINANCIAL INSTRUMENTS WITH CONTINGENT PAYMENTS," the entirety of which is hereby incorporated by reference into this application and which claims priority from U.S. Provisional Application No. 60/311,574, filed Aug. 10, 2001; (v) a continuation-in-part of application Ser. No. 10/218,124, filed Aug. 12, 2002, entitled, "METHODS AND SYSTEMS FOR OFFERING AND SERVICING FINANCIAL INSTRUMENTS," the entirety of which is hereby incorporated by reference into this application and which claims priority from U.S. Provisional Application No. 60/311,574, filed Aug. 10, 2001; and (vi) a continuation-in-part of application Ser. No. 10/217,885, filed Aug. 12, 2002, entitled, "SYSTEM AND METHOD FOR CREATING AND MANAGING NEW AND EXISTING FINANCIAL INSTRUMENTS," the entirety of which is hereby incorporated by reference into this application and which claims priority from U.S. Provisional Application Nos. 60/311,516 and 60/311,574, filed Aug. 10, 2001.

CROSS-REFERENCE TO RELATED APPLICATIONS

This application is a continuation-in-part of and claims priority from U.S. patent application Ser. No. 10/384,404, filed on Mar. 6, 2003, the entirety of which is hereby incorporated by reference into this application.

This application claims priority from U.S. patent application Ser. No. 10/064,744, entitled "CONTINGENT CONVERTIBLE FINANCIAL INSTRUMENTS", U.S. patent application Ser. No. 10/217,875, entitled "METHODS AND SYSTEMS FOR OFFERING AND SERVICING FINANCIAL INSTRUMENTS", U.S. patent application Ser. No. 10/064,745, entitled, "CONVERTIBLE FINANCIAL INSTRUMENTS WITH CONTINGENT PAYMENTS", U.S. patent application Ser. No. 10/218,124, entitled, "METHODS AND SYSTEMS FOR OFFERING AND SERVICING FINANCIAL INSTRUMENTS", U.S. patent application Ser. No. 10/217,885, entitled, "SYSTEM AND METHOD FOR CREATING AND MANAGING NEW AND EXISTING FINANCIAL INSTRUMENTS", all of which are hereby incorporated by reference into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to the field of financial instruments and more specifically to debt financial instruments that are convertible or exchangeable.

BACKGROUND OF THE INVENTION

Convertible financial instruments, such as convertible bonds or convertible preferred stock, are financial instruments that may be converted or exchanged for another financial instrument, such as a different financial instrument issued by the issuer of the convertible financial instrument or a financial instrument issued by a third entity. Convertible financial instruments can be of various types which provide differing benefits to an issuer.

For example, a zero coupon convertible is a convertible bond that pays no cash interest, but is issued at a deep discount from its face value and pays its face value at maturity. Some benefits of a zero coupon convertible to an issuer include cash savings due to the lack of interest payments and the ability to take tax deductions based on the original issue discount (e.g., the price at maturity minus the issue price).

Another example of a convertible financial instrument is a cash pay convertible bond, which is a convertible bond that pays cash interest over the life of the bond. Compared to a zero coupon convertible, a cash pay convertible has a shorter duration and is therefore less vulnerable to interest rate risk. As such, a cash pay convertible may provide to an issuer the benefit of greater marketability to certain purchasers, as compared with a zero coupon convertible.

SUMMARY OF THE INVENTION

The present invention provides a convertible or exchangeable financial instrument that combines the benefits of different types of financial instruments into a single financial instrument. This is accomplished by associating rate definitions with different time periods within the life of the inventive financial instrument. Each rate definition includes a rate and may include one or more rate modifiers, such as a minimum or maximum for the rate of the definition. The financial instrument earns returns in each time period according to the rate associated with the respective time period, where at least a portion of the returns earned in the first time period are paid in cash, and where all of the returns earned after the first time period are accrued.

For example, the present invention may combine the benefits of a cash pay convertible bond with the LYON™, a type of zero-coupon convertible bond offered by Merrill Lynch & Co., Inc., by providing a convertible financial instrument that is callable after a non-call period. In this example, the financial instrument has a first and a second time period, and a first rate definition associated with the first time period, with the first rate definition including a fixed rate greater than zero. At least a portion of the returns earned in the first time period are paid in cash and all the returns earned after the first time period are accrued. The financial instrument may also have a second rate definition associated with the second time period, with the second rate definition including a second rate, where returns are earned in the second period according to the second rate and all the returns earned in the second period are accrued. For example, the second rate definition may include a second rate that is a fixed rate.

An embodiment of the invention provides a method for obtaining capital. First, a convertible or exchangeable financial instrument having an accreted value and that earns returns over a lifetime comprising at least a first and a second time period is offered. At least some of the returns earned during the first time period are paid in cash. Also, all of the returns earned during the second time period are accreted to the accreted value of the financial instrument.

In another embodiment of the invention, the returns earned during the first time period are earned according to a first rate, and the returns earned during the second time period are earned according to a second rate.

In another embodiment, the returns earned during the first time period are earned according to a first rate that is a fixed rate.

In another embodiment, the returns earned during the first time period are earned according to a first rate that is a variable rate.

In another embodiment, the returns earned during the second time period are earned according to a second rate that is a fixed rate.

In another embodiment, the returns earned during the second time period are earned according to a second rate that is a variable rate.

In another embodiment, the returns earned during the first time period are earned according to a first rate as modified by one or more rate modifiers.

In another embodiment, the returns earned during the second time period are earned according to a second rate as modified by one or more rate modifiers.

In a further embodiment of the invention, another method for obtaining capital is provided. First, a convertible or exchangeable financial instrument is offered that earns returns and has an accreted value and that includes a provision that specifies at least a first and a second time period, and a first rate definition associated with the first time period that describes how returns are earned during the first time period, the first rate definition including at least a first rate. Next, the financial instrument is serviced during the first time period according to at least the first rate definition if the financial instrument is outstanding during the first time period such that at least a portion of the returns earned during the first time period are paid in cash. Then, the financial instrument is serviced during the second time period if the financial instrument is outstanding during the second time period such that any returns earned during the second time period are accreted to the accreted value of the financial instrument.

In another embodiment of the invention, a financial instrument is provided that includes at least three provisions. A first provision specifies at least an initial value for the financial instrument. A second provision specifies at least the identity of another financial instrument or an indexed value into which the financial instrument may be converted or for which the financial instrument may be exchanged or that the financial instrument will be converted, at least in part, into cash, and a number of units of the other instrument, or an amount of the indexed value, or an amount of cash, or some combination of these, into which or for which a single unit of the financial instrument may be converted or exchanged. A third provision specifies at least first and second time periods within the life of the financial instrument, a first rate definition associated with the first time period, the first rate definition including at least a first rate, wherein returns are earned during the first time period according to the first rate, wherein at least a portion of the returns earned during the first time period are paid in cash, and wherein any returns earned after the first time period are accreted to an accreted value of the financial instrument.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
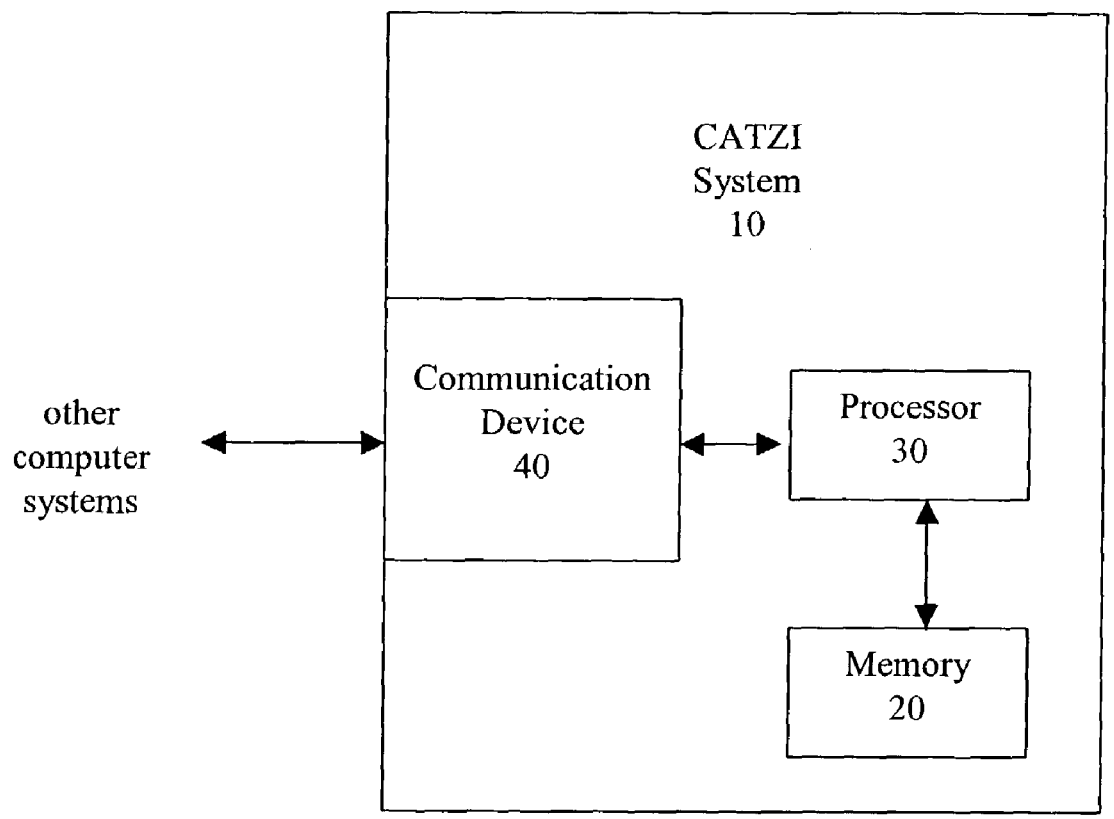
FIG. 1 is block diagram showing a system of the invention.

Preferred embodiments of a method, system, and article of manufacture containing software programs in accordance with the present invention are described with reference to the drawings in FIGS. 1-7.

The present invention provides a new type of financial instrument, as well as a method, a system, and article of manufacture containing software programs related to the financial instrument. Financial instrument (hereinafter, simply "instrument") is used broadly here to include any means by which money may be invested or saved such as, for example, trust certificates, guaranteed investment contracts, and securities, including, for example, bonds, common stocks and preferred stocks.

The instrument of the present invention ("the Inventive Instrument" or the "Cash to Zero Instrument" or "CATZ Instrument") is a convertible or exchangeable instrument whose lifetime is divided into at least two time periods, each of which may be associated with a rate definition, where each rate definition includes at least a rate. The Inventive Instrument earns returns in each time period according to the rate associated with the time period. At least a portion of the returns earned during the first time period are paid in cash, with the remainder being accrued, e.g., accreted to the accreted value of the Inventive Instrument. The accreted value of the Inventive Instrument refers to the sum of the initial value of the Inventive Instrument, e.g., as specified in the Price Provision and described further below, and any previously earned returns that have been accrued rather than paid in cash. Any returns earned after the first time period are accreted to the accreted value of the Inventive Instrument rather than paid in cash.

The Inventive Instrument has provisions each of which defines certain rights and obligations between the issuer of the Inventive Instrument ("the Issuer") and the owner of the Inventive Instrument ("the Owner" or "the Holder"). The Inventive Instrument may be any financial instrument that includes at least:

(1) a first provision, which may be referred to as the Price Provision, that specifies at least an initial value for the Inventive Instrument;

(2) a second provision, which may be referred to as the Conversion Provision, that specifies at least (a) the identity of another financial instrument or an indexed value into which the Inventive Instrument may be converted or for which the Inventive Instrument may be exchanged or that the Inventive Instrument will be converted, at least in part, into cash, and (b) a number of units of the other instrument, or an amount of the indexed value, or an amount of cash, or some combination of these, into which or for which a single unit of the Inventive Instrument may be converted or exchanged ("unit" here refers generally to a single unit of ownership of the Inventive Instrument, e.g., a single share where the Inventive Instrument is stock or a single bond where the Inventive Instrument is a bond); and (3) a third provision, which may be referred to as the Returns Provision, that specifies at least (a) first and second time periods within the life of the Inventive Instrument, (b) a first rate definition associated with the first time period, the first rate definition including at least a first rate, where returns are earned during the first time period according to the first rate, where at least a portion of the returns earned during the first time period are paid in cash, and where any returns earned after the first time period are accreted to the accreted value of the Inventive Instrument.

The Price Provision of the Inventive Instrument may be any provision of any financial instrument that specifies at least an initial value for the Inventive Instrument. The initial value of the Inventive Instrument may be, but need not be, the same as the issue price of the Inventive Instrument.

The Price Provision may specify the initial value of the Inventive Instrument in a number of ways. For example, the initial value may be specified as a fixed amount, e.g., $1,000. Alternatively, the Price Provision may specify the initial value of the Inventive Instrument by providing information that allows it to be determined. For example, the Price Provision may specify a formula that may be used to determine the initial value of the Inventive Instrument.

The Conversion Provision of the Inventive Instrument mentioned above describes the manner in which the Inventive Instrument may be converted into or exchanged for another financial instrument, or an indexed value, or cash, or some combination of these. As described above, the Conversion Provision may be any provision of any financial instrument that specifies at least (a) the identity of another financial instrument ("the Underlying Instrument") or an indexed value into which the Inventive Instrument may be converted or for which the Inventive Instrument may be exchanged or that the Inventive Instrument will be converted, at least in part, into cash, and (b) a number of units of the other financial instrument, or an amount of the indexed value, or an amount of cash, or some combination of these, into which or for which a single unit of the Inventive Instrument may be converted or exchanged.

The Conversion Provision may identify various other financial instruments or indexed values into which or for which the Inventive Instrument may be converted or exchanged. For example, the Conversion Provision may identify a stock or a debt security of the Issuer as the financial instrument into which the Inventive Instrument may be converted. In another example, the Conversion Provision may identify a stock or a debt security of an entity other than the Issuer as the financial instrument for which the Inventive Instrument may be exchanged. Also, the Conversion Provision may identify an indexed value, such as, for example, the Standard & Poor's ("S&P") 500 Index, into which the Inventive Instrument may be converted.

The Conversion Provision may specify the number of units of the Underlying Instrument into which or for which the a single unit of the Inventive Instrument may be converted or exchanged in various ways. For example, the Conversion Provision may specify the number of units of the Underlying Instrument as a fixed number, e.g., 13.8213 shares of common stock of the Issuer. In another example, the Conversion Provision may provide a formula that can be used to determine a number of units of the Underlying Instrument into which or for which a single unit of the Inventive Instrument may be converted or exchanged. Also, the Conversion Provision may specify the amount of the indexed value as a percentage, e.g., 20% of the S&P 500 Index, or as information allowing the amount to be determined.

The Returns Provision describes the returns associated with the Inventive Instrument during its lifetime. Returns is used broadly here to include, but not be limited to, interest and dividends. As mentioned above, the Returns Provision may be any provision of any financial instrument that specifies at least (a) first and second time periods within the life of the Inventive Instrument, (b) a first rate definition associated with the first time period, the first rate definition including at least a first rate, where returns are earned during the first time period according to the first rate, where at least a portion of the returns earned during the first time period are paid in cash, and where any returns earned after the first time period are accreted to the accreted value of the Inventive Instrument.

Various time periods within the life of the Inventive Instrument may be specified by the Returns Provision as the first and second time periods mentioned above. For example, the Returns Provision may specify the first and second time periods in relation to a time period during the life of the Inventive Instrument during which the Issuer may not redeem the Inventive Instrument from the Owner ("the Non-Call Period", described further below), and another period during which the Issuer can redeem the Inventive Instrument and the price (s) at which the Issuer can do so. For instance, the Returns Provision may specify the first time period as running from the issue date of the Inventive Instrument to the end of the Non-Call Period of the Inventive Instrument and the second time period as running from the day after the end of this Non-Call Period to the maturity date of the Inventive Instrument.

The Returns Provision may also specify the first and second time periods in relation to dates other than the end of the Non-Call Period, such as a date specified in a Put Provision. As described further below, a Put Provision specifies one or more dates at which the Owner can require the Issuer to redeem the Inventive Instrument and the prices at which this redemption can occur. For example, the Returns Provision may specify the first time period as running from the issue date of the Inventive Instrument to a date specified in the Put Provision and the second time period as running from the day after this date to the maturity date of the Inventive Instrument.

The Returns Provision may also specify the first and second time periods in terms of a date at which the Issuer and Owner both may terminate the Inventive Instrument at the same price. For example, as described below, if the Inventive Instrument includes a Call Provision with a Non-Call Period, the Issuer may redeem the Inventive Instrument from the Owner at any time after the end of the Non-Call Period. If the Inventive Instrument includes a Put Provision, the Owner may require the Issuer to redeem the Inventive Instrument at dates specified in the Put Provision. Thus the Returns Provision may specify the first and second time periods in terms of the first date specified in the Put Provision on which the Owner may require the Issuer to redeem the Inventive Instrument at the same price for which the Issuer may redeem the Inventive Instrument on or after the end of the Non-Call Period, e.g., the first time period may run from the issue date of the Inventive Instrument to this date and the second time period may run from the day after this date to the maturity date of the Inventive Instrument.

As mentioned above, the Returns Provision includes a first rate definition associated with the first time period. A rate definition provides the rate related terms that are to be applied during the time period with which the rate definition is associated. A rate definition includes at least a rate and may include one or more rate modifiers. Thus, a rate definition associated with a particular time period provides the rate to be applied during the time period, with the rate modified by any rate modifiers included in the rate definition. The first rate definition mentioned above includes a first rate and may, if desired, include one or more modifiers to the first rate, as described further below.

The Returns Provision may specify any rate for the first rate other than zero. For example, the Returns Provision may specify a fixed rate greater than zero for the first rate.

In another example, the Returns Provision may specify the first rate as a variable rate. Variable rate is used broadly herein to include a rate determined by one or more formulas based on objective financial or economic information. For example, a variable rate may be linked to any index (e.g., a variable rate determined as LIBOR −2% or as the Consumer Price Index) or any economic indicator (e.g., inflation +10%).

The Returns Provision may specify any variable rate for the first rate. For instance, the Returns Provision may specify a rate of LIBOR −2.0%. Although, in this example, a variable rate linked to the LIBOR index is described, it should be understood that a variable rate linked to any known index may be used with the present invention.

The Returns Provision may also specify the first rate in a number of ways. For example, in addition to specifying a fixed or variable rate, as mentioned above, the Returns Provision may provide information that allows the first rate to be determined, e.g., a formula.

As mentioned above, if desired, the Returns Provision may also specify one or more rate modifiers in association with the first rate as part of the first rate definition. A rate modifier may be any information that may be used to modify a rate, such as, for example, maximum or minimum limits for a variable rate.

The Returns Provision may specify rate modifiers in a number of ways. For example, where the rate modifier is a maximum or a minimum, the Returns Provision may specify the maximum or minimum as a fixed rate. For instance, the Returns Provision may specify a first rate of LIBOR −2.0% per annum and a maximum of 5.5% per annum and a minimum of 1% per annum.

Where the rate modifier is a maximum or a minimum, the Returns Provision may also provide information that will allow the maximum or minimum to be determined. For example, the Returns Provision may describe the maximum as the fixed rate the Issuer would have had to have assigned to another financial instrument, having an issue price and a face value, issued on the same date as the Inventive Instrument for the yield to maturity of this other financial instrument to be equivalent to the yield to maturity of the Inventive Instrument, if this other financial instrument were to pay cash returns to its owner throughout the life of this financial instrument at this fixed rate and if this other financial instrument were issued at a price substantially equivalent to its face value.

It should be noted that, if desired, the Returns Provision may specify negative fixed rates, e.g., −2.0%, as minimum rate modifiers. Also, the Returns Provision may specify a minimum of 0% to ensure a non-negative rate.

If desired, all of the returns earned during the first time period according to the first rate when the current value of the first rate is positive may be paid in cash to the Owner. For example, the Returns Provision may specify a first cash payment ratio in association with the first rate and the first time period that describes the amount of the returns earned according to the first rate that the Issuer pays in cash to the Owner during the first time period when the current value of the first rate is positive, with any amount of the returns earned according to the first rate not paid in cash being accrued, e.g., accreted to the accreted value of the Inventive Instrument. At any time that the current value of the first rate is negative, the first cash payment ratio is not used. Also, where no cash payment ratio is specified, then a predetermined ratio may be used as a default, e.g., no specified cash payment ratio results in 100% of returns being paid in cash.

For example, where the current value, described below, of the first rate is positive and the first cash payment ratio is specified as 50%, the Issuer will cause 50% of the returns earned according to the first rate during the first time period to be paid as cash payments to the Owner and will cause 50% of the returns earned according to the first rate during the first time period to be accreted to the accreted value of the Inventive Instrument. In another example, where the current value of the first rate is positive and the first cash payment ratio is specified as 75%, the Issuer will cause 75% of the returns earned according to the first rate during the first time period to be paid as cash payments to the Owner and will cause 25% of the returns earned according to the first rate during the first time period to be accreted to the accreted value of the Inventive Instrument.

It should be noted that the first cash payment ratio may be specified in a number of ways. For example, in addition to specifying a fixed percentage for the first cash payment ratio, as discussed above, the Returns Provision may provide information allowing the first cash payment ratio to be determined, e.g., a formula.

Negative rates, which may result, for example, where the Returns Provision has specified a variable rate for the first rate and has not specified a minimum of 0%, may be handled by the present invention in a number of ways. For example, the Returns Provision may include a sub-provision that describes how a negative first rate is handled. For instance, such a negative rate sub-provision may specify that, where the current value of a rate, described further below, is negative, (a) a setoff amount accretes at a rate equal to the absolute value of the current value of the rate, and (b) once a setoff amount exists, any returns that otherwise would have been accrued from a positive value of the rate are applied to the setoff amount until the setoff amount is reduced to zero, and thereafter returns accrue as otherwise stated.

To illustrate, assume a variable rate to be reset quarterly is associated with a time period of several years duration. After one or more quarters where the current value of the variable rate is positive, the accreted value of the Inventive Instrument is increased from an initial value of $1,000 to a value of $1,010. In one or more subsequent quarters, the current value of the variable rate is negative. In these quarters, the accreted value of the Inventive Instrument remains at $1,010 and a setoff amount accrues at the absolute value of the current value of the variable rate. When the current value of the variable rate is again positive, the returns that otherwise would have been earned are used to reduce the setoff amount to zero before returns are again paid or accreted to the accreted value.

As mentioned above, if desired, the Returns Provision may also specify a second rate definition associated with the second time period. The second rate definition includes a second rate that describes the rate at which returns are earned during the second time period. Any returns earned during the second time period are accreted to the accreted value of the Inventive Instrument. If desired, the second rate definition may also include one or more rate modifiers, similar to those described above, associated with the second rate.

The Returns Provision may specify any rate for the second rate of the second rate definition. For example, the Returns Provision may specify a variable rate, as described above, for the second rate, e.g., a rate linked to an index or an economic indicator. Also, the Returns Provision may specify a fixed rate for the second rate.

As with the first rate definition, the Returns Provision may specify the second rate in a number of ways, including, for example, providing information to allow the second rate to be determined, e.g., a formula.

It should be noted that rates may also be specified by implication. For example, a face value at maturity may be specified for the Inventive Instrument, e.g., in the Price Provision described above. The second rate associated with the second time period would then be a fixed rate equivalent to the rate of accrual over the second time period from the initial value of the Inventive Instrument to the face value at maturity of the Inventive Instrument. In such a case, a second rate definition need not be specified in the Returns Provision.

Similarly, as described in connection with the first rate definition, where the Returns Provision specifies rate modifiers for the second rate definition, such rate modifiers may be specified in a number of ways, including, for example, providing information to allow them to be determined, e.g., formulas.

Also, to handle the possibility of a negative second rate, the Returns Provision may include a sub-provision that describes how a negative second rate is handled. Similar to the sub-provision described above for handling a negative first rate, such a negative rate sub-provision for the second rate may specify that, where the current value of the second rate is negative, (a) a setoff amount accretes at a rate equal to the absolute value of the current value of the rate, and (b) once a setoff amount exists, any returns that otherwise would have been accrued from a positive value of the rate are applied to the setoff amount until the setoff amount is reduced to zero, and thereafter returns accrue as otherwise stated.

It should be noted that the Returns Provision may specify a single negative rate sub-provision, as shown above, which applies to both the first and second time periods. Alternatively, separate negative rate sub-provisions (or no negative rate sub-provision) may be specified for each time period, such that the negative rates in each time period will be handled according to the negative rate sub-provision for the respective time period or ignored if no negative rate sub-provision is associated with the respective time period.

Also, it should be noted that any accrued returns and setoff amount carry over from the first time period to the second time period.

Also, it should be noted that returns are earned during any time period based on the current value of the rate for the time period as modified by any associated modifiers. Where the rate for a time period is a variable rate, the current value of the rate may be the value of the variable rate as set according to known standards and procedures, e.g., monthly, quarterly, semiannually, or annually. So, for example, where a variable rate is reset quarterly, the current value of the rate is determined at the beginning of the quarter according to the one or more formulas describing the variable rate, and thereafter the current value of the rate remains fixed until the next reset date or the time period ends. Where the rate for a time period is a fixed rate, the current value of the rate during the time period is simply the value of the fixed rate.

To illustrate, assume the Returns Provision specifies a variable rate of LIBOR −2% per annum reset quarterly with a minimum of 0% for the first time period and a variable rate of LIBOR −2% per annum reset quarterly with a minimum of 0% and a maximum of 5.5% per annum for the second time period. If both time periods are one year in duration, then the rate associated with the first time period will have four different current values during the time period as calculated at the beginning of each quarter according to the formula (s) of the first variable rate and any rate modifiers associated with the rate, e.g., LIBOR −2% per annum reset quarterly with a minimum of 0%. After the first time period, a new rate is applied to the Inventive Instrument whose current value is determined in a similar manner according to the second variable rate and any associated rate modifiers, e.g., LIBOR −2% per annum reset quarterly with a minimum of 0% and a maximum of 5.5% per annum.

If desired, the Inventive Instrument may be callable after a non-call period, e.g., it may comprise a provision, which may be referred to as the Call Provision, that specifies at least two time periods within the life of the Inventive Instrument, where the Issuer can redeem the Inventive Instrument from the Owner during one period and cannot during the other period. The Call Provision may be any provision of any financial instrument that specifies at least (a) two time periods within the life of the Inventive Instrument, during at least one of which the Issuer cannot redeem the Inventive Instrument from the Owner ("the Non-Call Period"), and (b) one or more prices at which the Issuer can redeem the Inventive Instrument.

The Call Provision may specify the two time periods mentioned above in various ways. For example, the Call Provision may specify a single date during the life of the Inventive Instrument such that the Non-Call Period for the Inventive Instrument runs from the issue date of the Inventive Instrument to the date specified by the Call Provision.

The Call Provision may specify the one or more prices at which the Inventive Instrument can be redeemed in a number of ways. For example, the Call Provision may specify one or more prices corresponding to one or more dates or time periods, such that the Inventive Instrument can be redeemed at the one or more prices at or during the corresponding one or more dates or time periods. In another example, the Call Provision may provide information allowing the price at which the Issuer can redeem the Inventive Instrument to be determined, e.g., a formula.

If desired, the Inventive Instrument may be putable, e.g., it may comprise a provision, which may be referred to as the Put Provision, that describes the right of the Owner to require the Issuer to redeem the Inventive Instrument. The Put Provision may be any provision of any financial instrument that specifies at least (a) one or more dates within the life of the Inventive Instrument and (b) prices corresponding to each of these dates at which the redemption may occur.

The Put Provision may specify the prices at which the Owner may require the Issuer to redeem the Inventive Instrument in a number of ways. For example, the Put Provision may specify a price corresponding to each of the one or more dates. In another example, the Put Provision may provide information allowing a price at which the Owner may require the Issuer to redeem the Inventive Instrument to be determined, e.g., a formula.

If desired, the Inventive Instrument may also comprise another provision, which may be referred to as the Contingent Payment Provision, that describes the payment of contingent payments from the Issuer to the Owner over the life of the Inventive Instrument. The Contingent Payment Provision may be any provision of a financial instrument that specifies at least one or more contingencies and, associated with each of the one or more contingencies, a payment to be made by the Issuer to the Owner upon the occurrence of the respective contingency. Contingent payments are described in detail in U.S. patent application Ser. No. 10/064,745, entitled, "CONVERTIBLE FINANCIAL INSTRUMENTS WITH CONTINGENT PAYMENTS" and U.S. patent application Ser. No. 10/218,124, entitled, "METHODS AND SYSTEMS FOR OFFERING AND SERVICING FINANCIAL INSTRUMENTS", both of which have been incorporated by reference here in their entirety.

Based on the above general description, several exemplary embodiments of the Inventive Instrument may now be described.

In one exemplary embodiment, the Inventive Instrument is a bond comprising the following provisions:

(1) a Price Provision that specifies (a) an issue price as the initial value for the bond, and (b) a face value for the bond;

(2) a Conversion Provision that specifies (a) the common stock of the Issuer as the financial instrument into which the bond may be converted, and (b) a number of units of the common stock of the Issuer into which a single bond may be converted;

(3) a Call Provision that specifies a date during the life of the bond on or after which the Issuer can redeem the bond from the Owner;

(4) a Put Provision that specifies one or more put dates during the life of the bond; and (5) a Returns Provision that specifies (a) a first time period from the issue date of the bond to the first put date after the end of the Non-Call Period on which the issuer may be required to redeem the bond at the same price that the issuer can redeem the bond and the second time period running from the day after this put date to maturity, (b) a first rate definition associated with the first time period, the first rate definition including a first rate that is a fixed rate greater than zero, and (c) a first cash payment ratio of 100% associated with the first rate and the first time period.

Thus, this exemplary embodiment represents a convertible, callable, and putable bond which pays 100% of the returns earned during the non-call period as cash and thereafter resembles a zero-coupon bond since no portion of the returns earned after the non-call period are paid in cash, but rather are accrued until maturity when the accreted value is paid.

In another exemplary embodiment, the Inventive Instrument is a bond comprising the same provisions as the embodiments above, and also comprising a Contingent Payment Provision.

Although the Inventive Instrument has been described above as a single financial instrument, the Inventive Instrument may also comprise a plurality of financial instruments packaged and issued together where the package of financial instruments comprises the provisions of the Inventive Instrument described above. Such packaging may be desirable, for example, to achieve different tax or accounting results as compared with a single instrument.

To obtain capital through the Inventive Instrument or to service the Inventive Instrument, an entity, such as an issuer, an underwriter, or a calculation agent, may operate the CATZ Instrument ("CATZI") System 10 of the present invention, shown in FIG. 1. FIG. 1 is a block diagram showing a system of the present invention.

The CATZI System 10 may comprise several components, a Memory 20, a Processor 30, and a Communication Device 40. The Memory 20 may be any structure capable of storing data and computer code, such as, RAM or magnetic or optical disks that are fixed or removable. Memory 20 stores data relating to the Inventive Instrument including the provisions described above. Memory 20 also stores computer code which, when executed by a computer, causes the computer to offer and service the Inventive Instrument, as described further below.

The Processor 30 may be any computer processor capable of operating on data according to computer code. Processor 30 operates according to the computer code stored in Memory 20 and transmits and receives information from other computer systems through Communication Device 40.

Communication Device 40 may be any equipment capable of transmitting and receiving data to and from computer systems, such as, for example, a network interface or a modem.

Figure 2:
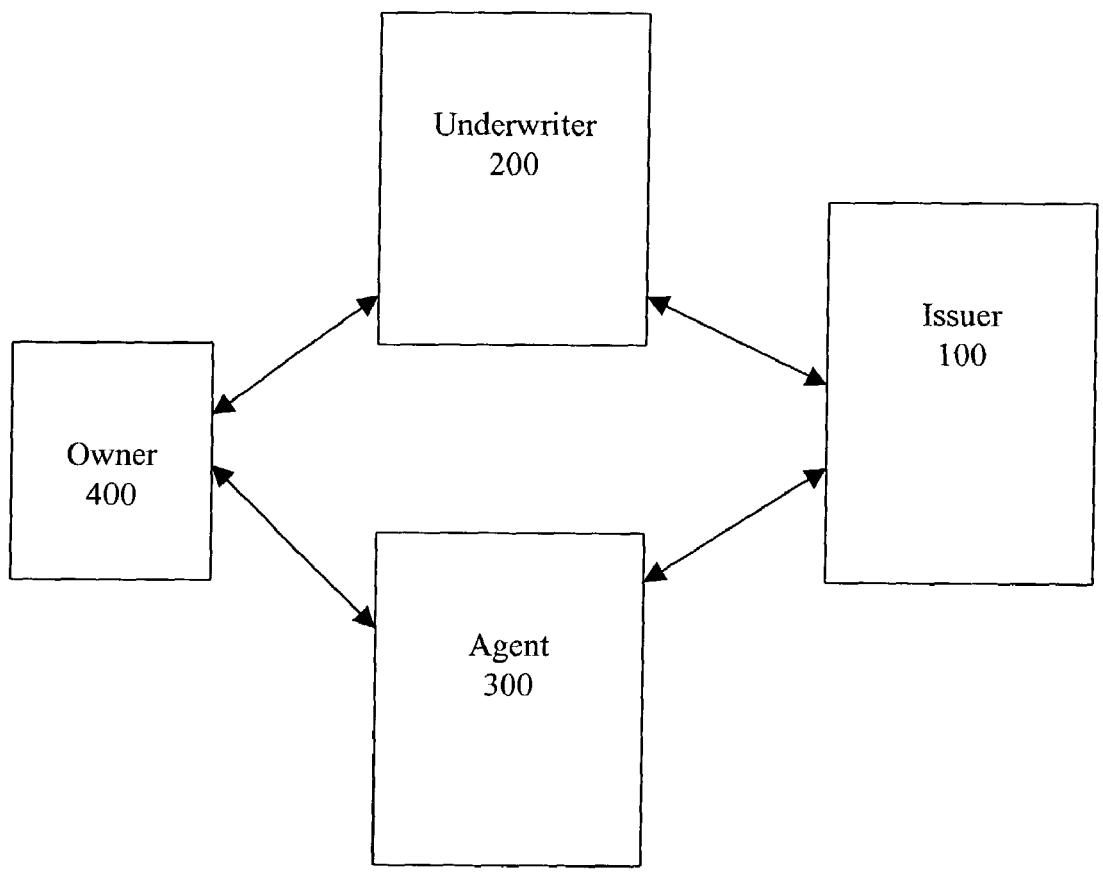
FIG. 2 is a block diagram showing the information flow between entities related to a financial instrument of the invention.

FIG. 2 is a block diagram showing the flow of information between entities related to the Inventive Instrument, e.g., an Issuer 100, an Underwriter 200, and Agent 300, and an Owner 400.

Figure 3:
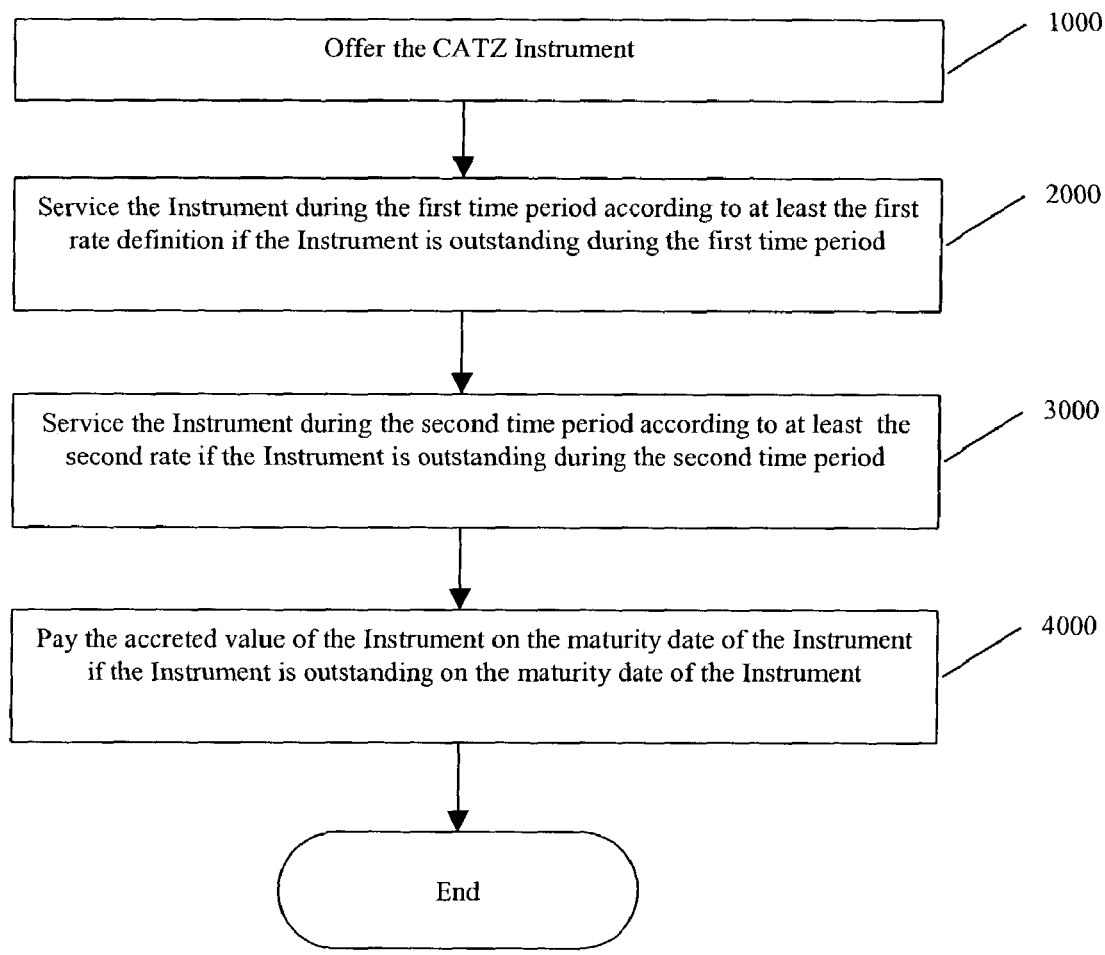
FIG. 3 is a flowchart showing an operative embodiment of the invention through which an entity may obtain capital.

FIG. 3 is a flowchart showing one way in which an entity, such as Issuer 100 or Underwriter 200, may obtain capital through the Inventive Instrument using the CATZI System 10. First, as represented by block 1000, an entity, e.g., the Issuer 100 or Underwriter 200, offers the CATZ Instrument of the invention. For example, the Issuer 100 may use CATZI System 10 to send a request to Underwriter 200 to underwrite a new financial instrument issue and transmit data related to the CATZ Instrument, e.g., the provisions of the Inventive Instrument described above. If the Underwriter agrees, it may send an acceptance to Issuer 100 and proceed to buy all the units of the Inventive Instrument to be issued by the Issuer 100 and then sell units of the Inventive Instrument to one or more Owners 400, who may be, for example, institutional or individual investors.

Figure 5:
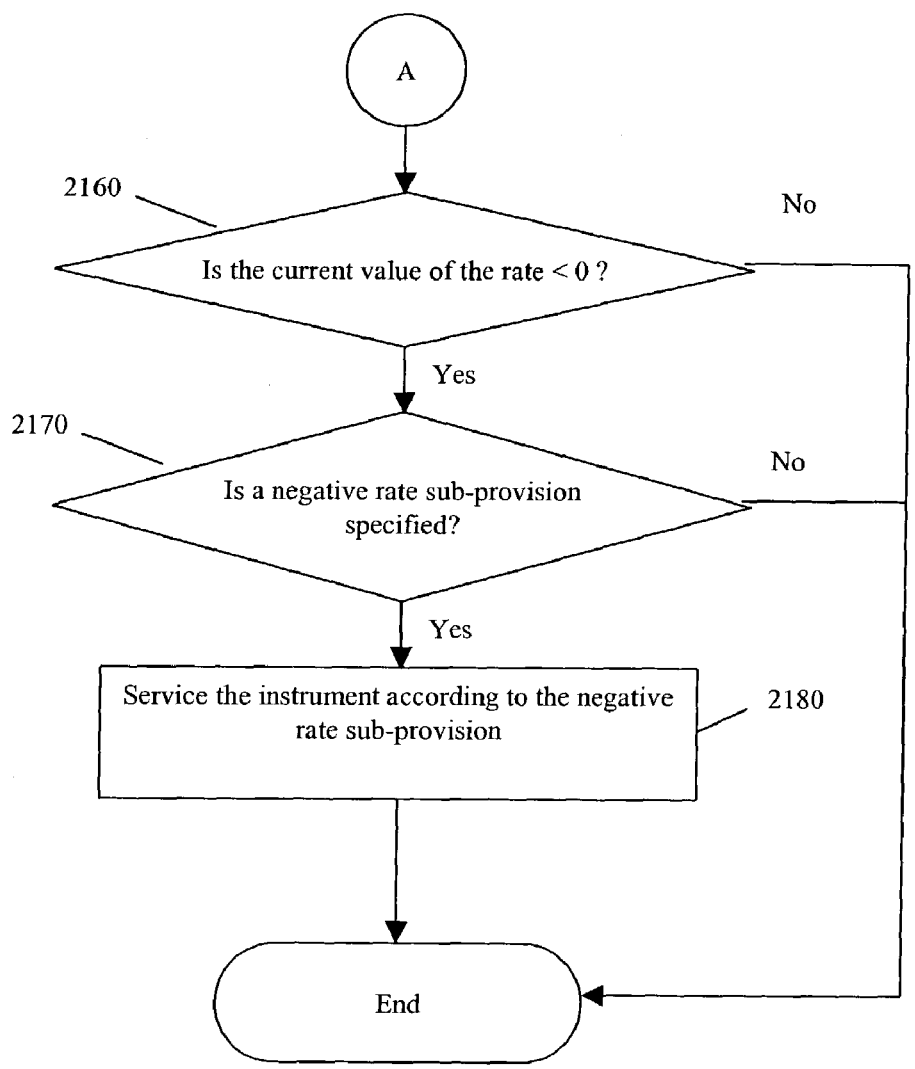
FIG. 5 is a flowchart showing another operative embodiment of the invention through which an entity services a financial instrument.
Figure 6:
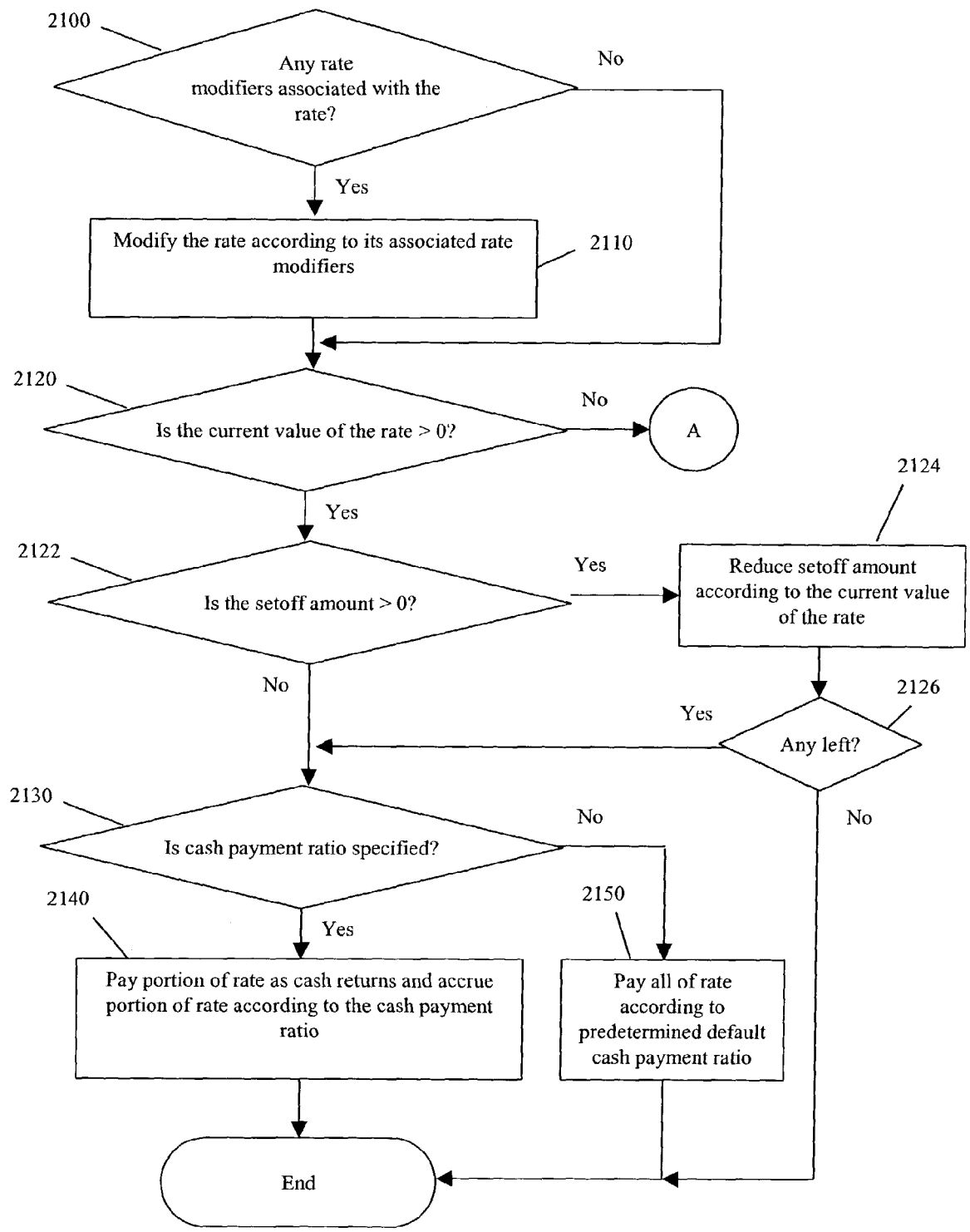
FIG. 6 is a flowchart showing another operative embodiment of the invention through which an entity services a financial instrument.

After the instrument of the invention has been offered and issued, an entity, e.g., the Issuer 100, Underwriter 200, or Agent 300, may service the Inventive Instrument during the first time period according to at least the first rate definition if the Inventive Instrument is outstanding during the first time period, as represented by block 2000. For example, an entity may operate CATZI System 10 to perform this servicing according to computer code and the provisions of the Inventive Instrument stored in Memory 20, as shown in the flowcharts of FIGS. 4-6.

It should be noted that the first and second time periods may vary according to how they are specified in the Returns Provision of the financial instrument as described previously. For example, as described previously, where the Inventive Instrument is putable and callable after a non-call period, the first time period may be specified as running from the issue date of the financial instrument to the first date specified in the Put Provision after the end of the Non-Call Period on which the Owner can require the Issuer to redeem the Inventive Instrument at the same price for which the Issuer can redeem the Inventive Instrument on or after the end of the Non-Call Period. The second time period may be specified as running from the day after this date to the maturity date of the Inventive Instrument.

Figure 4:
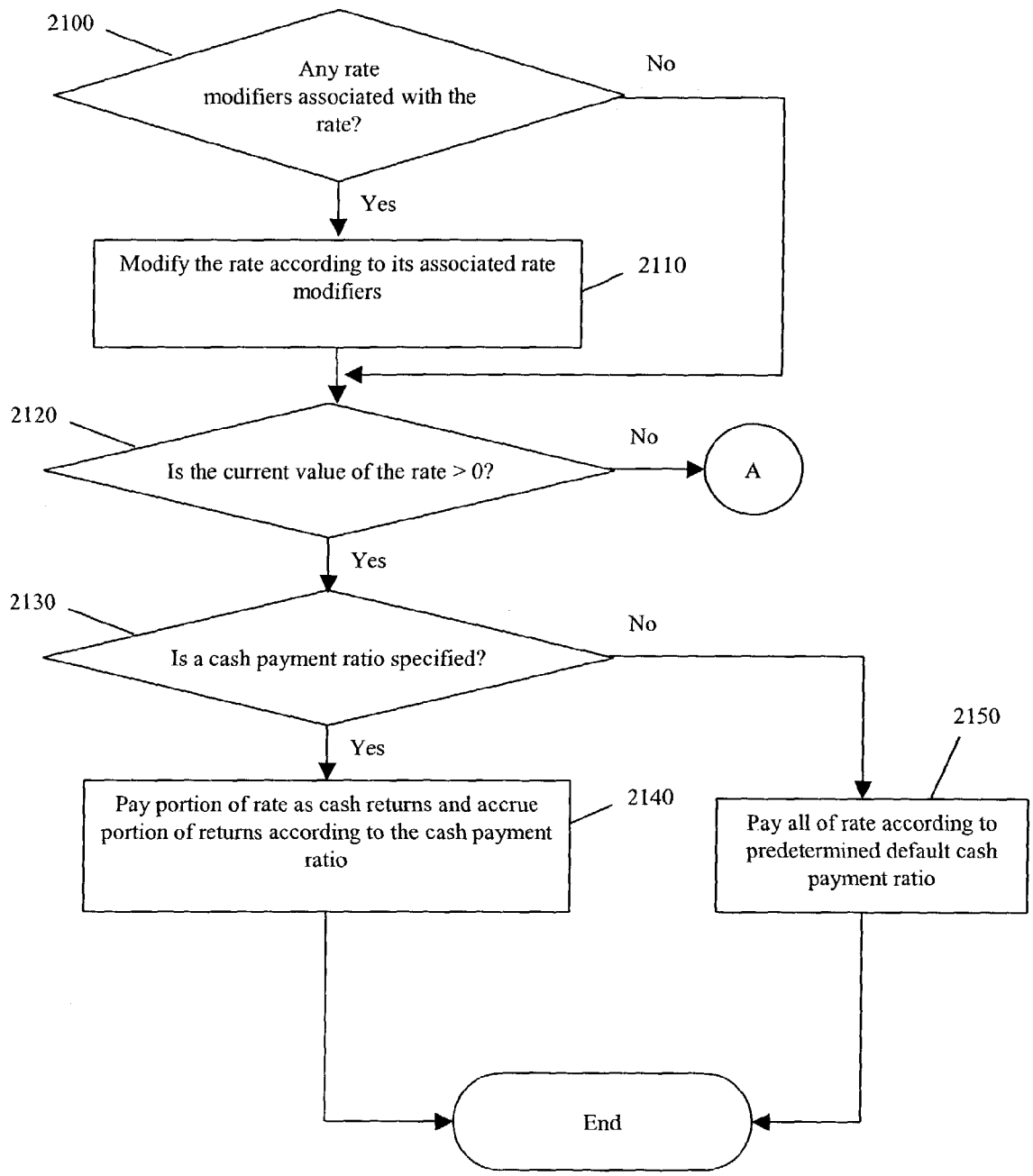
FIG. 4 is a flowchart showing an operative embodiment of the invention through which an entity services a financial instrument.

As shown in FIG. 4, the CATZI System 10 first determines whether any rate modifiers are associated with the first rate, as represented in block 2100. If this determination is negative, processing continues with the operations represented in block 2120. If there are rate modifiers, e.g., maximum or minimum, included in the first rate definition, then CATZI System 10 modifies the first rate according to the associated rate modifiers, as represented in block 2110. For example, if the rate modifier is a maximum and the current value of the rate is greater than the maximum, CATZI System 10 reduces the current value of the rate to this maximum. Similarly, if the rate modifier is a minimum and the current value of the rate is less than the minimum, CATZI System 10 increases the current value of the rate to this minimum.

Next, as represented in block 2120, a determination is made as to whether the current value of the first rate is greater than zero. If this determination is negative, processing continues with the operations represented in block 2160 of FIG. 5.

If this determination is positive, processing continues with the operations represented in block 2130 where a determination is made as to whether a first cash payment ratio is specified. If this determination is negative, processing continues with the operations in block 2150 where all the applicable returns earned according to the first rate are paid according to a predetermined default cash payment ratio, e.g., 100%. For example, the CATZI System 10 may calculate the amount of returns currently due according to the current value of the first rate and then communicate with Agent 300 to pay this amount in cash to Owner 400.

If the determination of block 2130 is positive, then processing continues with the operations represented in block 2140 where a portion of the applicable returns earned according to the first rate is paid in cash and a portion of the applicable returns earned according to the first rate is accrued, e.g., accreted to the accreted value of the Inventive Instrument, according to the first cash payment ratio. For example, the CATZI System 10 may calculate the amount of returns currently due according to the current value of the first rate, and then communicate with Agent 300 to pay a portion of this amount to the Owner 400 in cash and accrue a portion of this amount on behalf of the Owner 400, with the portions paid in cash and accrued determined according to the first cash payment ratio, as described previously.

Where the current value of the first rate is not greater than zero, processing continues with FIG. 5 and the operations in block 2160 where a determination is made as to whether the current value of the first rate is less than zero. If the current value of the first rate is not less than zero, e.g., the current value of the first rate equals zero, then processing terminates.

If the determination of block 2160 is positive, then processing continues with the operations in block 2170 where a determination is made as to whether a negative rate sub-provision is specified (either for both the first and second rates or for only the first rate). If this determination is negative, then processing terminates.

If this determination is positive, then processing continues with the operations in block 2180 where the CATZI System 10 services the financial instrument of the invention according to the negative rate sub-provision applicable for the first rate.

As described previously, different negative rate sub-provisions may be specified. Where a negative rate sub-provision as described above is specified, then the instrument of the invention may be serviced according to this negative rate sub-provision by, for example, accruing a setoff amount at a rate equal to the absolute value of the current value of the first rate. For instance, an amount may be calculated based on the absolute value of the current value of the first rate. This amount may then be used to create a new setoff amount or may be added to an existing setoff amount.

Where the instrument of the invention includes a negative rate sub-provision that is described and serviced as discussed above, then servicing of the instrument that is performed when the current value of the first rate is positive becomes modified. FIG. 6 is a flowchart showing the servicing of a positive current rate value when such a negative rate sub-provision is specified. In FIG. 6, the operations in blocks numbered the same as the blocks of FIG. 4 are performed in a similar manner as described above in connection with FIG. 4.

In FIG. 6, if the determination of block 2120 is positive, processing continues with the operations in block 2122 where a determination is made as to whether the setoff amount is greater than zero, e.g., whether a setoff amount exists. If this determination is negative, then processing continues with the operations represented in block 2130.

If this determination is positive, then processing continues with the operations represented in block 2124, where CATZI System 10 causes the setoff amount to be reduced according to the current value of the first rate. For example, CATZI System 10 may calculate an amount according to the current value of the first rate and decrease the setoff amount by this calculated amount. If the setoff amount would otherwise be reduced below zero, it is set to zero.

If the calculated amount is large enough so that some is remaining after the setoff amount is reduced to zero, then processing continues with the operations in block 2130 where this remaining amount is paid or accrued according to any first accrual ratio specified.

Returning to FIG. 3, after the first time period ends, if the instrument of the invention is still outstanding then the entity services the instrument during the second time period according to at least the second rate if the instrument is outstanding during the second time period, as represented by block 3000. For example, where a second rate definition is specified, then the instrument is serviced during the second time period according to the second rate of the second rate definition as well as any second rate modifiers of the second rate definition. Also, where no second rate definition is specified, e.g., the second rate is specified by implication through a specified face value as mentioned above, then the instrument is serviced during the second time period according to the implied second rate.

An entity may service the instrument by, for example, operating CATZI System 10 to perform this servicing according to computer code and the provisions of the Inventive Instrument stored in Memory 20. The servicing of the instrument of the invention during the second time period may be performed in a similar manner to that described above in connection with the flowcharts of FIGS. 4-6 and the servicing of the instrument during the first time period. It should be noted that, with respect to the servicing of the instrument of the invention during the second time period, since returns earned during the period are always accrued, e.g., accreted to the accreted value of the Inventive Instrument, there is no cash payment ratio specified for the second time period. Thus, in FIGS. 4 and 6, processing may progress from blocks 2120, 2122, or 2126 directly to block 2140 where any applicable returns are accrued, e.g., accreted to the accreted value of the Inventive Instrument.

Returning to FIG. 3, if on the maturity date of the instrument of the invention the instrument is still outstanding, an entity, e.g., the Issuer 100, pays the accreted value of the instrument, as represented in block 4000. For example, the Issuer 100 may operate CATZI System 10 to instruct Agent 300 to pay the amount of the accreted value of the instrument to an Owner 400.

Figure 7:
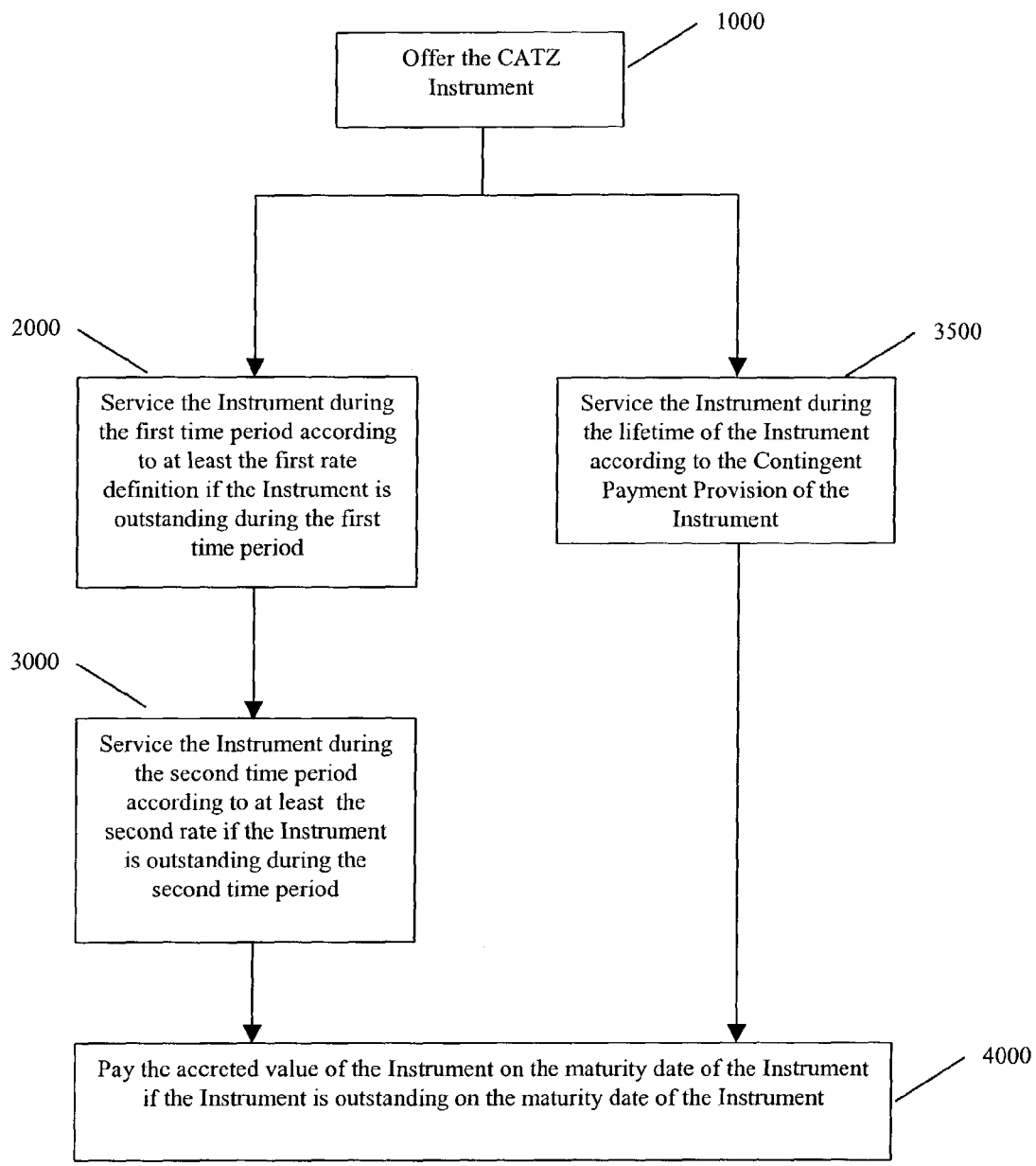
FIG. 7 is a flowchart showing another operative embodiment of the invention through which an entity may obtain capital.

FIG. 7 is a flowchart showing another way in which an entity, e.g., an issuer or underwriter, may obtain capital through the Inventive Instrument using the CATZI System 10. In FIG. 7, the operations in blocks numbered the same as the blocks of FIG. 3 are performed in a similar manner as described above in connection with FIG. 3. In FIG. 7, the instrument of the invention offered in the operations represented in block 1000 includes a Contingent Payment Provision, as described previously. After the instrument of the invention has been offered and issued, servicing of the instrument takes place in two parallel lines of operation. As described above in connection with FIG. 3, the instrument is serviced during the first time period by the operations represented in block 2000 and during the second time period by the operations represented in block 3000. At the same time, during the life of the instrument of the invention, the CATZI System 10 services the instrument of the invention according to the Contingent Payment Provision. This may accomplished in the manner described above as well as in U.S. patent application Ser. No. 10/064,745, entitled, "CONVERTIBLE FINANCIAL INSTRUMENTS WITH CONTINGENT PAYMENTS" and U.S. patent application, Ser. No. 10/218,124, entitled, "METHODS AND SYSTEMS FOR OFFERING AND SERVICING FINANCIAL INSTRUMENTS".

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for obtaining capital, comprising:
offering a convertible or exchangeable financial instrument that has an accreted value and that earns returns over a lifetime of the financial instrument, wherein the lifetime comprises at least a first time period and a second time period;
determining, by a computer system, a non-call period of the financial instrument, the non-call period comprising at least a portion of the first time period and/or the second time period, wherein the non-call period indicates a time for which an issuer of the financial instrument cannot redeem the financial instrument;
determining, by the computer system, a cash payment ratio for the financial instrument;
paying at least a portion of the returns earned during the first time period in cash, wherein the portion of the returns paid in cash is determined according to the cash payment ratio and one or more of the returns are calculated by the computer system; and
accreting returns earned during the second time period to the accreted value of the financial instrument.

2. The method of claim 1, wherein the offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate.

3. The method of claim 2, wherein the offering comprises offering a convertible or exchangeable financial instrument having an accreted value that earns returns over a lifetime comprising at least a first and a second time period, wherein the returns earned during the first time period are earned according to a first rate that is a fixed rate, and wherein the returns earned during the second time period are earned according to a second rate.

4. The method of claim 2, wherein the offering comprises offering a convertible or exchangeable financial instrument having an accreted value that earns returns over a lifetime comprising at least a first and a second time period, wherein the returns earned during the first time period are earned according to a first rate that is a variable rate, and wherein the returns earned during the second time period are earned according to a second rate.

5. The method of claim 2, wherein the offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate that is a fixed rate.

6. The method of claim 2, wherein the offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate that is a variable rate.

7. The method of claim 2, wherein the offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate, wherein the first and second rates are the same.

8. The method of claim 2, wherein the offering comprises offering a convertible or exchangeable financial instrument having an accreted value that earns returns over a lifetime comprising at least a first and a second time period, wherein the returns earned during the first time period are earned according to a first rate as modified by one or more rate modifiers, and wherein the returns earned during the second time period are earned according to a second rate.

9. The method of claim 2, wherein the offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate as modified by one or more rate modifiers.

10. The method of claim 1, wherein the returns earned during the first time period are earned according to a negative rate and the returns earned during the second time period are earned according to a second rate, and further comprising accreting a setoff amount, wherein the setoff amount accretes at a rate equal to an absolute value of the negative rate;
wherein accreting returns earned during the second time period to the accreted value of the financial instrument comprises accreting a difference between the setoff amount and the returns earned during the second time period.

11. The method of claim 1, further comprising determining a put provision of the financial instrument, wherein the put provision specifies one or more conditions under which an owner of the financial instrument may require the issuer to redeem the financial instrument, the conditions comprising:
   at least one or more dates within the first time period and/or the second time period at which the financial instrument may be redeemed; and
   a price corresponding to each of the at least one or more dates at which the financial instrument may be redeemed.

12. The method of claim 1, further comprising determining a call provision of the financial instrument, wherein the call provision specifies the non-call period, one or more time periods during which the issuer may redeem the financial instrument, and one or more prices at which the issuer may redeem the financial instrument, the one or more prices corresponding to the one or more time periods.

13. A system for obtaining capital, comprising:
   a processor;
   a memory linked to the processor and storing data related to a financial instrument that is convertible or exchangeable, that has an accreted value, and that earns returns over a lifetime, wherein the financial instrument includes a cash payment ratio and the lifetime comprises at least a first time period and a second time period;
   wherein the processor is programmed to participate in:
   determining a non-call period of the financial instrument, wherein the non-call period comprises at least a portion of the first time period and/or the second time period, wherein the non-call period indicates a time for which an issuer of the financial instrument cannot redeem the financial instrument;
   offering the financial instrument;
   paying at least a portion of the returns earned by the financial instrument during the first time period in cash, wherein the portion paid in cash is determined according to the cash payment ratio and one or more of the returns are calculated by the processor; and
   accreting returns earned by the financial instrument during the second time period to the accreted value of the financial instrument.

14. The system of claim 13, wherein the processor is programmed to participate in offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate.

15. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate that is a fixed rate, and wherein the returns earned during the second time period are earned according to a second rate.

16. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate that is a variable rate, and wherein the returns earned during the second time period are earned according to a second rate.

17. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate that is a fixed rate.

18. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate that is a variable rate.

19. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate, wherein the first and second rates are the same.

20. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate as modified by one or more rate modifiers, and wherein the returns earned during the second time period are earned according to a second rate.

21. The system of claim 14, wherein the processor is programmed to participate in offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate as modified by one or more rate modifiers.

22. A computer program product comprising a non-transitory computer readable storage medium having computer readable code stored therein, the computer readable code, when executed, causing a computer to implement a method for obtaining capital, the method comprising:
   offering a convertible or exchangeable financial instrument having an accreted value that earns returns over a lifetime, wherein the financial instrument includes a cash payment ratio and the lifetime comprises at least a first time period and a second time period;
   determining a non-call period of the financial instrument, wherein the non-call period comprises at least a portion of the first time period and/or the second time period, wherein the non-call period indicates a time for which an issuer of the financial instrument cannot redeem the financial instrument;
   paying at least a portion of the returns earned during the first time period in cash, wherein the portion paid in cash is determined according to the cash payment ratio and one or more of the returns are calculated by the computer; and
   accreting returns earned during the second time period to the accreted value of the financial instrument.

23. The computer program product of claim 22, wherein offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate.

24. The computer program product of claim 23, wherein offering comprises offering a convertible or exchangeable financial instrument having an accreted value that earns returns over a lifetime comprising at least a first and a second time period, wherein the returns earned during the first time period are earned according to a first rate that is a fixed rate, and wherein the returns earned during the second time period are earned according to a second rate.

25. The computer program product of claim 23, wherein offering comprises offering a convertible or exchangeable financial instrument having an accreted value that earns returns over a lifetime comprising at least a first and a second time period, wherein the returns earned during the first time period are earned according to a first rate that is a variable rate, and wherein the returns earned during the second time period are earned according to a second rate.

26. The computer program product of claim 23, wherein offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate that is a fixed rate.

27. The computer program product of claim 23, wherein offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate that is a variable rate.

28. The computer program product of claim 23, wherein offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate, wherein the first and second rates are the same.

29. The computer program product of claim 23, wherein offering comprises offering a convertible or exchangeable financial instrument having an accreted value that earns returns over a lifetime comprising at least a first and a second time period, wherein the returns earned during the first time period are earned according to a first rate as modified by one or more rate modifiers, and wherein the returns earned during the second time period are earned according to a second rate.

30. The computer program product of claim 23, wherein offering comprises offering a convertible or exchangeable financial instrument having an accreted value that earns returns over a lifetime comprising at least a first and a second time period, wherein the returns earned during the first time period are earned according to a first rate, and wherein the returns earned during the second time period are earned according to a second rate as modified by one or more rate modifiers.

* * * * *